United States Patent
Youn et al.

(10) Patent No.: US 9,655,023 B2
(45) Date of Patent: May 16, 2017

(54) APPARATUS AND METHOD FOR OPERATING CO-SITE IN MOBILE COMMUNICATION SYSTEM

(71) Applicant: Samsung Electronics Co. Ltd., Suwon-si, Gyeonggi-do (KR)

(72) Inventors: Il-Jin Youn, Bucheon-si (KR); Jae-Hee Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 115 days.

(21) Appl. No.: 13/726,949

(22) Filed: Dec. 26, 2012

(65) Prior Publication Data
US 2013/0163566 A1 Jun. 27, 2013

(30) Foreign Application Priority Data
Dec. 26, 2011 (KR) .......................... 10-2011-0141994

(51) Int. Cl.
*H04W 36/30* (2009.01)
*H04W 36/08* (2009.01)
*H04W 36/22* (2009.01)

(52) U.S. Cl.
CPC ........... *H04W 36/30* (2013.01); *H04W 36/22* (2013.01); *H04W 36/08* (2013.01)

(58) Field of Classification Search
USPC .......................... 370/329–332; 455/422–450
See application file for complete search history.

(56) References Cited

U.S. PATENT DOCUMENTS

| | | | |
|---|---|---|---|
| 6,091,955 A * | 7/2000 | Aalto et al. .................. 455/447 |
| 6,556,829 B1 * | 4/2003 | Persson ....................... 455/437 |
| 8,095,134 B2 * | 1/2012 | Huang ..................... H04L 1/20 370/331 |
| 8,805,373 B2 * | 8/2014 | Chayat .................. H04W 16/12 455/436 |
| 2004/0157561 A1 * | 8/2004 | Akerberg ................... 455/67.11 |
| 2005/0124344 A1 * | 6/2005 | Laroia et al. ................ 455/436 |
| 2007/0135125 A1 * | 6/2007 | Kim ..................... H04B 1/7105 455/436 |
| 2008/0125126 A1 | 5/2008 | Fang et al. |
| 2009/0069016 A1 | 3/2009 | Zhao |
| 2009/0163223 A1 | 6/2009 | Casey |
| 2009/0275339 A1 * | 11/2009 | Weaver ................ H04W 16/12 455/447 |
| 2010/0173631 A1 * | 7/2010 | Kim et al. ................... 455/436 |
| 2010/0195636 A1 * | 8/2010 | Nakashima et al. .......... 370/342 |

(Continued)

FOREIGN PATENT DOCUMENTS

KR WO2009/113782 A2 * 9/2009

*Primary Examiner* — Yemane Mesfin
*Assistant Examiner* — Peter Chen
(74) *Attorney, Agent, or Firm* — Jefferson IP Law, LLP

(57) ABSTRACT

Provided is a method for operating a co-site by a Base Station (BS) in a mobile communication system. The method includes determining a first number of Mobile Stations (MSs) among MSs connected to a cell to perform handover to a co-site using an Air Resource (AR) utilization of the cell that uses a first Frequency Reuse Pattern (FRP) and an AR utilization of the co-site that uses a second FRP, or determining a second number of MSs among MSs connected to the co-site to perform handover to the cell; and sending a handover initiation message to the MSs according to the determinations.

6 Claims, 6 Drawing Sheets

(56) References Cited

U.S. PATENT DOCUMENTS

2011/0032909 A1* 2/2011 Park et al. .................... 370/332
2011/0206006 A1* 8/2011 Chindapol et al. ........... 370/331
2011/0212744 A1* 9/2011 Katayama et al. ........... 455/522

* cited by examiner

APPARATUS AND METHOD FOR OPERATING CO-SITE IN MOBILE COMMUNICATION SYSTEM

PRIORITY

This application claims the benefit under 35 U.S.C. §119(a) of a Korean Patent Application filed in the Korean Intellectual Property Office on Dec. 26, 2011 and assigned Serial No. 10-2011-0141994, the entire disclosure of which is incorporated herein by reference.

BACKGROUND OF THE INVENTION

Field of the Invention

The present invention relates to an apparatus and method for operating a co-site in a mobile communication system.

Description of the Related Art

Typical examples of the next-generation mobile communication systems include a Mobile Worldwide Interoperability for Microwave Access (WiMAX) communication system, an Institute of Electrical and Electronics Engineers (IEEE) 802.16 communication system, an Evolved Packet System (EPS) communication system, and a Long-Term Evolution (LTE) mobile communication system.

The Mobile WiMAX communication system considers using a variety of frequency reuse factors, i.e., a variety of Frequency Reuse Patterns (FRPs). For example, the Mobile WiMAX communication system considers using an FRP1 when considering an aspect of the spectral efficiency, and considers using an FRP3 when considering an aspect of the interference and coverage. FRPn represents FRP=n. The Mobile WiMAX communication system actively considers using the FRP3, considering a gain in terms of the interference and coverage.

If a load for throughput increases while a network is operated with limited frequency resources, the network throughput needs to be increased considering a variety of schemes, a typical one of which is to increase carriers.

However, in the scheme of increasing carriers, the number of required Frequency Assignments (FAs) increases according to the FRP in use, causing the significant cost due to the increase in the cost of using frequencies. For example, if the network is expanded with FRP3, 6 FAs are needed. In this case, the cost of using frequencies increases according to the use of 6 FAs, causing the significant cost.

Therefore, there is a need for a scheme capable of minimizing the cost while increasing the carriers.

SUMMARY OF THE INVENTION

An aspect of exemplary embodiments of the present invention is to provide an apparatus and method for operating a co-site in a mobile communication system.

Another aspect of exemplary embodiments of the present invention is to provide an apparatus and method for operating a co-site by increasing carriers in a mobile communication system.

Further another aspect of exemplary embodiments of the present invention is to provide an apparatus and method for operating a co-site considering load balancing in a mobile communication system.

Still another aspect of exemplary embodiments of the present invention is to provide an apparatus and method for operating a co-site considering the channel quality in a mobile communication system.

In accordance with one aspect of the present invention, there is provided a method for operating a co-site by a Base Station (BS) in a mobile communication system. The method includes determining a first number of Mobile Stations (MSs) among MSs connected to a cell to perform handover to a co-site using an Air Resource (AR) utilization of the cell that uses a first Frequency Reuse Pattern (FRP) and an AR utilization of the co-site that uses a second FRP, or determining a second number of MSs among MSs connected to the co-site to perform handover to the cell; and sending a handover initiation message to the MSs according to the determinations.

In accordance with another aspect of the present invention, there is provided a Base Station (BS) in a mobile communication system. The BS includes a control unit for determining a first number of Mobile Stations (MSs) among MSs connected to a cell to perform handover to a co-site using an Air Resource (AR) utilization of the cell that uses a first Frequency Reuse Pattern (FRP) and an AR utilization of the co-site that uses a second FRP, or determining a second number of MSs among MSs connected to the co-site to perform handover to the cell; and a transmitting unit for sending a handover initiation message to the MSs according to the determinations.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

Preferred embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

The present invention provides an apparatus and method for operating a co-site in a mobile communication system. In addition, the present invention provides an apparatus and method for operating a co-site by increasing carriers in a mobile communication system. Further, the present invention provides an apparatus and method for operating a co-site considering load balancing in a mobile communication system. Besides, the present invention provides an apparatus and method for operating a co-site considering the channel quality in a mobile communication system.

In the following description of the present invention, the mobile communication system will be assumed to be, for example, a Mobile Worldwide Interoperability for Microwave Access (WiMAX) communication system. It will be apparent to those of ordinary skill in the art that the co-site operation apparatus and method proposed in the present invention may be used not only in the Mobile WiMAX communication system, but also in an Institute of Electrical and Electronics Engineers (IEEE) 802.16 communication system, an Evolved Packet System (EPS) communication system, a Long-Term Evolution (LTE) mobile communication system, and the like.

Also, in the following description of the present invention, the channel quality is represented using, for example, a Channel Quality Indicator (CQI), and the CQI will be assumed to be generated based on a Carrier to Interference and Noise Ratio (CINR).

Figure 1:
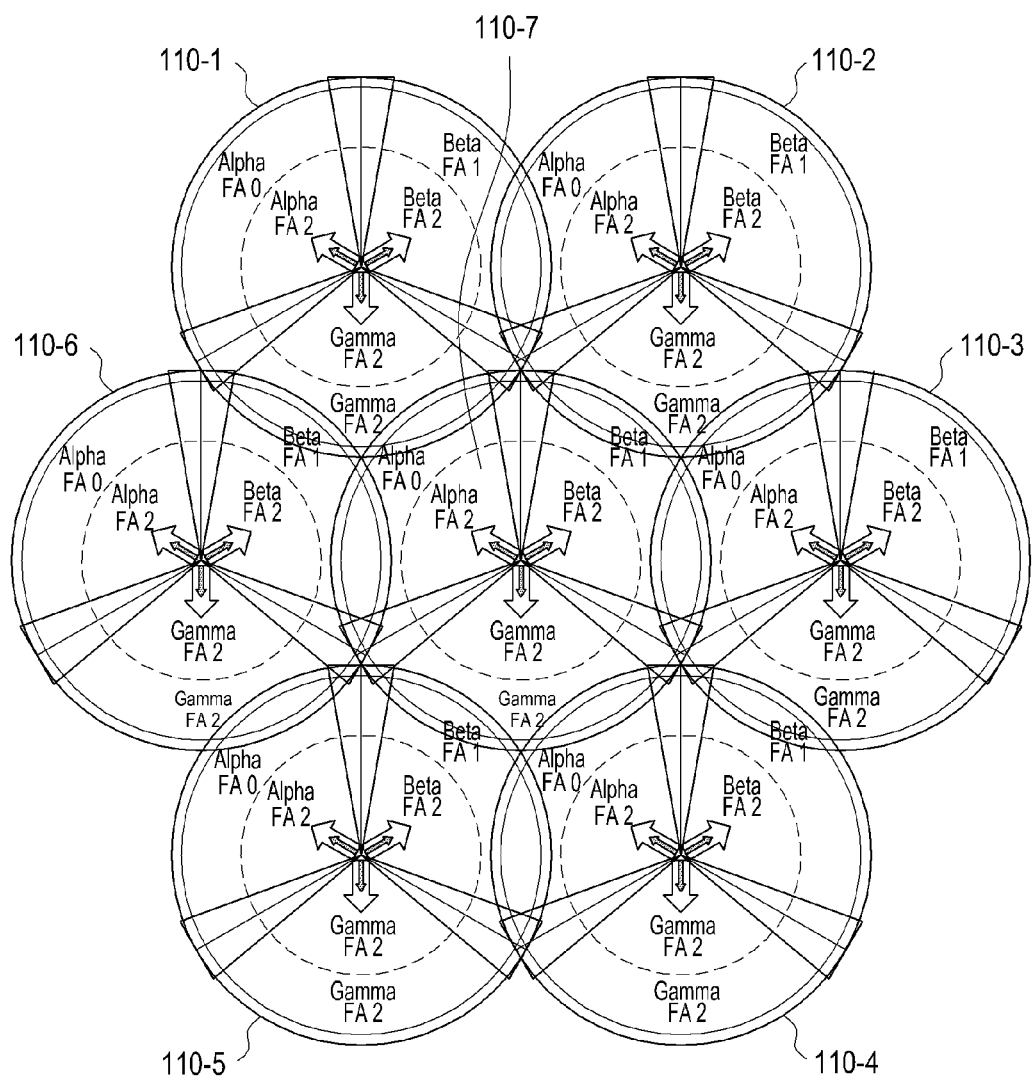
FIG. 1 schematically illustrates a cell configuration of a Mobile WiMAX communication system according to a first embodiment of the present invention.

FIG. 1 schematically illustrates a cell configuration of a Mobile WiMAX communication system according to a first embodiment of the present invention.

Prior to a description of FIG. 1, it will be assume that all cells included in the Mobile WiMAX communication system according to the first embodiment of the present invention uses a co-site.

Referring to FIG. 1, the Mobile WiMAX communication system includes n cells, for example, seven cells (i.e., a cell #1 110-1 to a cell #7 110-7), and it will be assumed that each of the cell #1 110-1 to the cell #7 110-7 uses a Frequency Reuse Pattern #n (FRPn), for example, FRP3, and a co-site of the cell uses FRPm, for example, FRP1. In addition, it will be assumed that each of the cell #1 110-1 to the cell #7 110-7 and a co-site of the cell use, for example, k sectors (e.g., three sectors), and use a Multiple Input Multiple Output (MIMO) scheme. Here, it will be assumed that each of the cell #1 110-1 to the cell #7 110-7 and a co-site of the cell use, for example, a 2 Transmission antennas & 2 Reception antennas (2T2R)-based MIMO scheme that uses two transmit antennas and two receive antennas.

Next, reference will be made to FIG. 2 to describe a process of operating a co-site by a Base Station (BS) in a Mobile WiMAX communication system according to the first embodiment of the present invention.

Figure 2:
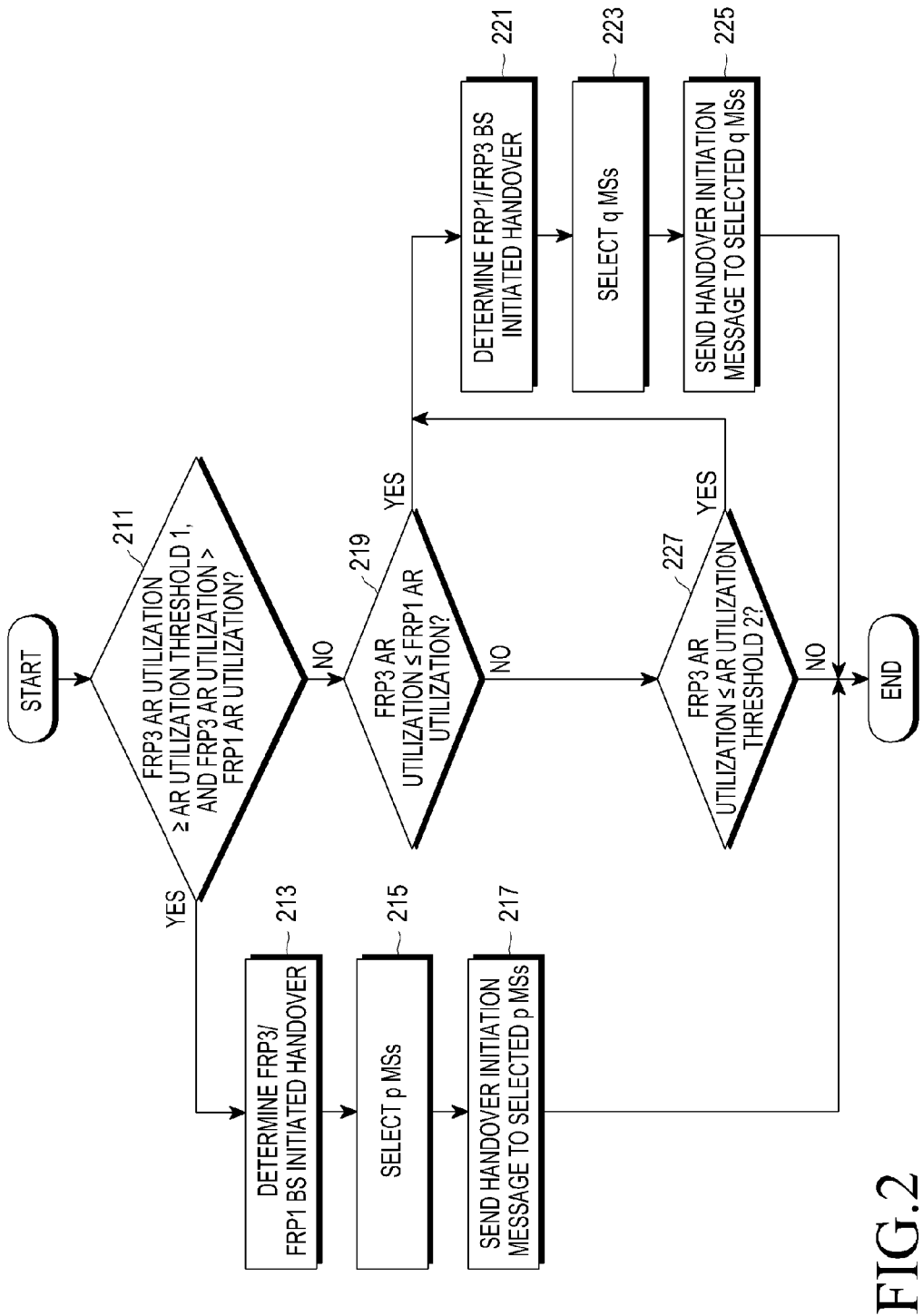
FIG. 2 is a flowchart illustrating a process of operating a co-site by a BS in a Mobile WiMAX communication system according to the first embodiment of the present invention.

FIG. 2 is a flowchart illustrating a process of operating a co-site by a BS in a Mobile WiMAX communication system according to the first embodiment of the present invention.

Prior to a description of FIG. 2, it will be apparent to those of ordinary skill in the art that the co-site operation process described in FIG. 2 is applied in the same way in all BSs that manage each of the cells included in the Mobile WiMAX communication system.

Referring to FIG. 2, the BS determines in step 211 whether Air Resource (AR) utilization of a cell being operated with FRP3 is greater than or equal to a preset first AR utilization threshold and the AR utilization of a cell being operated with FRP3 exceeds AR utilization of the co-site being operated with FRP1. The first AR utilization threshold will be assumed to be, for example, 90%, and it will be apparent to those of ordinary skill in the art that the first AR utilization threshold is subject to change according to the system environment of the Mobile WiMAX communication system. For convenience of description, AR utilization of a cell being operated with FRP3 will be referred to as 'FRP3 AR utilization', and AR utilization of a co-site being operated with FRP1 will be referred to as 'FRP1 AR utilization'.

If it is determined that FRP3 AR utilization is greater than or equal to a first AR utilization threshold and the FRP3 AR utilization exceeds FRP1 AR utilization, the BS determines FRP3/FRP1 BS initiated handover in step 213. The term 'FRP3/FRP1 BS initiated handover' as used herein may refer to initiating handover by a BS to switch a connection of p Mobile Stations (MSs) among the MSs connected to a cell being operated with FRP3, to a co-site being operated with FRP1.

In step 215, the BS selects p MSs from the MSs connected to the cell. The p MSs are selected from MSs having a co-site CQI exceeding a CQI threshold among the MSs connected to the cell, in order of high co-site CQI, and the co-site CQI represents CQI in the co-site. If the number of MSs having the co-site CQI exceeding the CQI threshold is less than p, the BS may select only the MSs having the co-site CQI exceeding the CQI threshold to perform FRP3/FRP1 BS initiated handover. In contrast, the BS may select the remaining MSs from MSs except for the MSs having the co-site CQI exceeding the CQI threshold together with the MSs having the co-site CQI exceeding the CQI threshold, in order of the highest co-site CQI. In step 217, the BS sends a handover initiation message including a handover initiation command to the selected p MSs.

However, if it is determined in step 211 that the FRP3 AR utilization is less than the first AR utilization threshold or the FRP3 AR utilization is less than or equal to the FRP1 AR utilization, the BS determines in step 219 whether the FRP3 AR utilization is less than or equal to the FRP1 AR utilization. If it is determined that the FRP3 AR utilization is less than or equal to the FRP1 AR utilization, the BS determines FRP1/FRP3 BS initiated handover in step 221. The term 'FRP1/FRP3 BS initiated handover' as used herein may refer to initiating handover by a BS to switch a connection of q MSs among the MSs connected to a co-site being operated with FRP1, to a cell being operated with FRP3.

In step 223, the BS selects q MSs from the MSs connected to the cell. The q MSs are selected from the MSs having the co-site CQI less than or equal to the CQI threshold among the MSs connected to the cell, in order of low co-site CQI. If the number of MSs having the co-site CQI less than or equal to the CQI threshold is less than q, the BS may select only the MSs having the co-site CQI less than or equal to the CQI threshold to perform FRP1/FRP3 BS initiated handover. In contrast, it will be apparent to those of ordinary skill in the art that the BS may select the remaining MSs from MSs except for the MSs having the co-site CQI less than or equal to the CQI threshold together with the MSs having the co-site CQI less than or equal to the CQI threshold, in order of the lowest co-site CQI. In step 225, the BS sends a handover initiation message including a handover initiation command to the selected q MSs.

However, if it is determined in step 219 that the FRP3 AR utilization exceeds the FRP1 AR utilization, the BS determines in step 227 whether the FRP3 AR utilization is less than or equal to a second AR utilization threshold. The second AR utilization threshold will be assumed to be, for example, 80%, and it will be apparent to those of ordinary skill in the art that the second AR utilization threshold is subject to change according to the system environment of the Mobile WiMAX communication system. If it is determined that the FRP3 AR utilization is less than or equal to the second AR utilization threshold, the BS proceeds to step 221.

It will be apparent to those of ordinary skill in the art that the co-site operation process described in FIG. 2 may be performed at stated periods, or may be performed adaptively according to the BS situation. In the case where the co-site operation process is performed at stated periods, the period determined in advance in the Mobile WiMAX communication system may be used intact as the co-site operation period, or the co-site operation period may be determined adaptively according to the BS situation.

In the case where the co-site operation process is performed adaptively according to the BS situation, there may be a variety of parameters used to determine the situation of the BS that performs the co-site operation process. The parameters may include load, throughput, service quality and the like of the BS. There may be a variety of ways to determine the time in which the BS performs the co-site operation process considering the parameters, and a detailed description thereof will be omitted herein.

Next, reference will be made to FIG. 3 to describe a correlation between FRP3 AR utilization and FRP1 AR utilization in a process of operating a co-site by a BS in a Mobile WiMAX communication system according to the first embodiment of the present invention.

Figure 3:
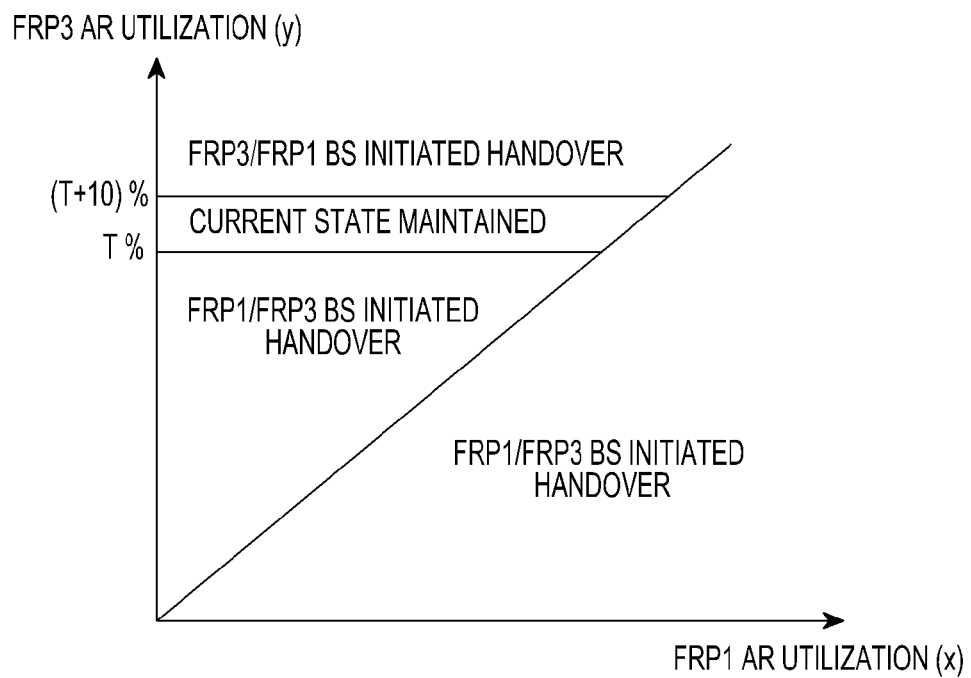
FIG. 3 is a graph illustrating a correlation between FRP3 AR utilization and FRP1 AR utilization in a process of operating a co-site by a BS in a Mobile WiMAX communication system according to the first embodiment of the present invention.

FIG. 3 is a graph illustrating a correlation between FRP3 AR utilization and FRP1 AR utilization in a process of operating a co-site by a BS in a Mobile WiMAX communication system according to the first embodiment of the present invention.

Referring to FIG. 3, the y-axis represents FRP3 AR utilization, the x-axis represents FRP1 AR utilization, and 'T' represents a first AR utilization threshold. As shown in FIG. 3, if the FRP1 AR utilization increases, the use of FRP1 causes an increase in inter-cell interference. Thus, the FRP1 AR utilization is set to increase less than the FRP3 AR utilization.

In FIG. 3, a drop rate is set low to connect to the cell the MSs which are dropped to outrage of the co-site. In this case, if the dropped MSs are all accommodated considering a Call Admission Control (CAC), the first AR utilization threshold T is set to 90%, and if there is a minimum requirement is the CAC, the first AR utilization threshold T is set to 80~85% leaving a margin of a minimum of 5~10% to accommodate the dropped MSs.

Next, reference will be made to FIG. 4 to describe a cell configuration of a Mobile WiMAX communication system according to a second embodiment of the present invention.

Figure 4:
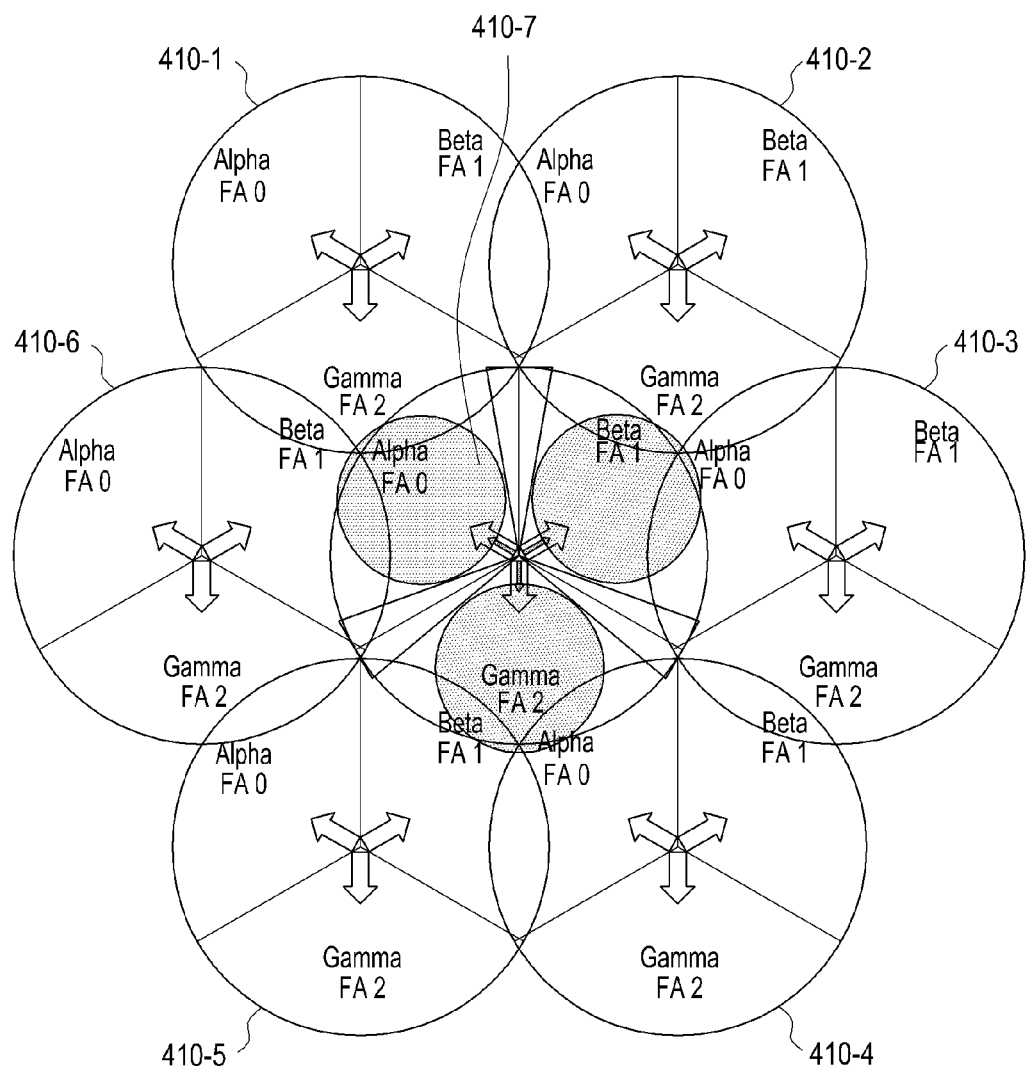
FIG. 4 schematically illustrates a cell configuration of a Mobile WiMAX communication system according to a second embodiment of the present invention.

FIG. 4 schematically illustrates a cell configuration of a Mobile WiMAX communication system according to a second embodiment of the present invention.

Prior to a description of FIG. 4, it will be assumed that for the Mobile WiMAX communication system according to the second embodiment of the present invention, only specific cells among the cells included in the Mobile WiMAX communication system may use the co-site. In FIG. 4, for convenience of description, it will be assumed that only one of the cells included in the Mobile WiMAX communication system uses the co-site.

Referring to FIG. 4, the Mobile WiMAX communication system includes n cells, for example, seven cells (i.e., a cell #1 410-1 to a cell #7 410-7), and it will be assumed that each of the cell #1 410-1 to the cell #7 410-7 uses FRPn, for example, FRP3, and only the cell #7 410-7 uses the co-site. The co-site of the cell #7 410-7 will be assumed to use FRPm, for example, FRP1.

It will be assumed that each of the cell #1 710-1 to the cell #7 710-7 and a co-site of the cell #7 710-7 use, for example, k sectors (e.g., three sectors), and use the MIMO scheme. Here, it will be assumed that each of the cell #1 710-1 to the cell #7 710-7 and a co-site of the cell #7 710-7 use, for example, a 2T2R-based MIMO scheme that uses two transmit antennas and two receive antennas.

Next, reference will be made to FIG. 5 to describe a process of operating a co-site by a BS in a Mobile WiMAX communication system according to the second embodiment of the present invention.

Figure 5:
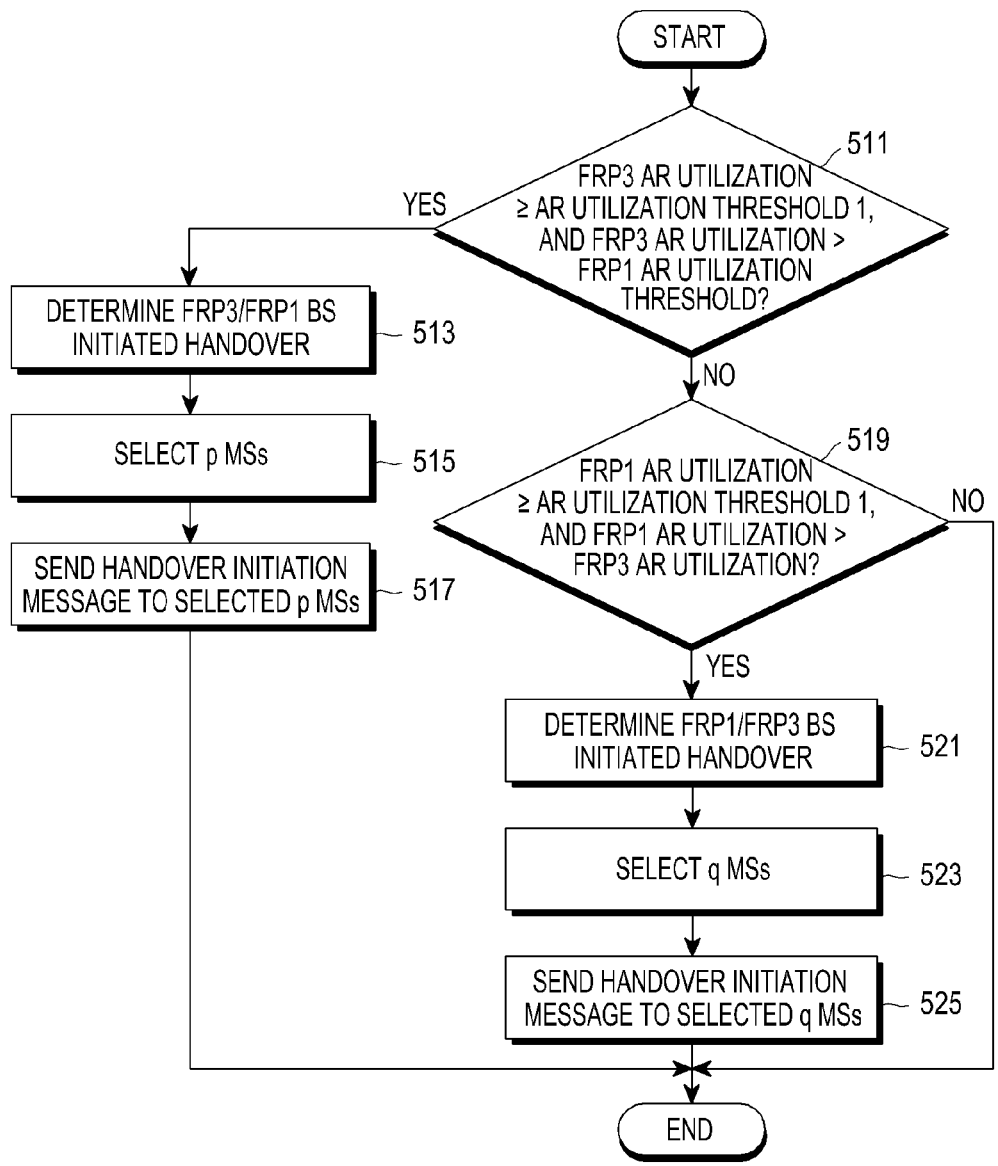
FIG. 5 is a flowchart illustrating a process of operating a co-site by a BS in a Mobile WiMAX communication system according to the second embodiment of the present invention.

FIG. 5 is a flowchart illustrating a process of operating a co-site by a BS in a Mobile WiMAX communication system according to the second embodiment of the present invention.

Prior to a description of FIG. 5, it will be apparent to those of ordinary skill in the art that the co-site operation process described in FIG. 5 is applied only to the BS that uses the co-site, among the cells included in the Mobile WiMAX communication system.

Referring to FIG. 5, the BS determines in step 511 whether FRP3 AR utilization is greater than or equal to a preset first AR utilization threshold and the FRP3 AR utilization exceeds FRP1 AR utilization. The first AR utilization threshold will be assumed to be, for example, 50%, and it will be apparent to those of ordinary skill in the art that the first AR utilization threshold is subject to change according to the system environment of the Mobile WiMAX communication system.

If it is determined that the FRP3 AR utilization is greater than or equal to the first AR utilization threshold and the FRP3 AR utilization exceeds the FRP1 AR utilization, the BS determines FRP3/FRP1 BS initiated handover in step 513. In step 515, the BS selects p MSs from the MSs connected to the cell. The P MSs are selected from MSs having a co-site CQI exceeding a CQI threshold among the MSs connected to the cell, in order of high co-site CQI, and the co-site CQI represents a CQI in the co-site. If the number of MSs having the co-site CQI exceeding the CQI threshold is less than p, the BS may select only the MSs having the co-site CQI exceeding the CQI threshold to perform FRP3/FRP1 BS initiated handover. In contrast, it will be apparent to those of ordinary skill in the art that the BS may select the remaining MSs from MSs except for the MSs having the co-site CQI exceeding the CQI threshold together with the MSs having the co-site CQI exceeding the CQI threshold, in order of the highest co-site CQI. In step 517, the BS sends a handover initiation message including a handover initiation command to the selected p MSs.

If it is determined in step 511 that the FRP3 AR utilization is less than the first AR utilization threshold or the FRP3 AR utilization is less than or equal to the FRP1 AR utilization, the BS determines in step 519 whether the FRP1 AR utilization is greater than or equal to the first AR utilization threshold, and the FRP1 AR utilization exceeds the FRP3

AR utilization. If it is determined that the FRP1 AR utilization is greater than or equal to the first AR utilization threshold, and the FRP1 AR utilization exceeds the FRP3 AR utilization, the BS determines FRP1/FRP3 BS initiated handover in step 521.

In step 523, the BS selects q MSs from the MSs connected to the cell. The q MSs are selected from MSs having the co-site CQI less than or equal to the CQI threshold among the MSs connected to the cell, in order of low co-site CQI. If the number of MSs having the co-site CQI less than or equal to the CQI threshold is less than q, the BS may select only the MSs having the co-site CQI less than or equal to the CQI threshold to perform FRP1/FRP3 BS initiated handover. In contrast, it will be apparent to those of ordinary skill in the art that the BS may select the remaining MSs from MSs except for the MSs having the co-site CQI less than or equal to the CQI threshold together with the MSs having the co-site CQI less than or equal to the CQI threshold, in order of the lowest co-site CQI. In step 525, the BS sends a handover initiation message including a handover initiation command to the selected q MSs.

It will be apparent to those of ordinary skill in the art that the CQI threshold used in the co-site operation process by the BS in the Mobile WiMAX communication system according to the second embodiment of the present invention, which has been described in FIG. 5, may or may not be equal to the CQI threshold used in the co-site operation process by the BS in the Mobile WiMAX communication system according to the first embodiment of the present invention.

It will be apparent to those of ordinary skill in the art that the co-site operation process described in FIG. 5 may be performed at stated periods, or may be performed adaptively according to the BS situation. In the case where the co-site operation process is performed at stated periods, the period determined in advance in the Mobile WiMAX communication system may be used intact as the co-site operation period, or the co-site operation period may be determined adaptively according to the BS situation. In the case where the co-site operation process is performed adaptively according to the BS situation, there may be a variety of parameters used to determine the situation of the BS that performs the co-site operation process. The parameters may include load, throughput, service quality and the like of the BS. There may be a variety of ways to determine the time in which the BS performs the co-site operation process considering the parameters, and a detailed description thereof will be omitted herein.

Next, reference will be made to FIG. 6 to describe a correlation between FRP3 AR utilization and FRP1 AR utilization in a process of operating a co-site by a BS in a Mobile WiMAX communication system according to the second embodiment of the present invention.

Figure 6:
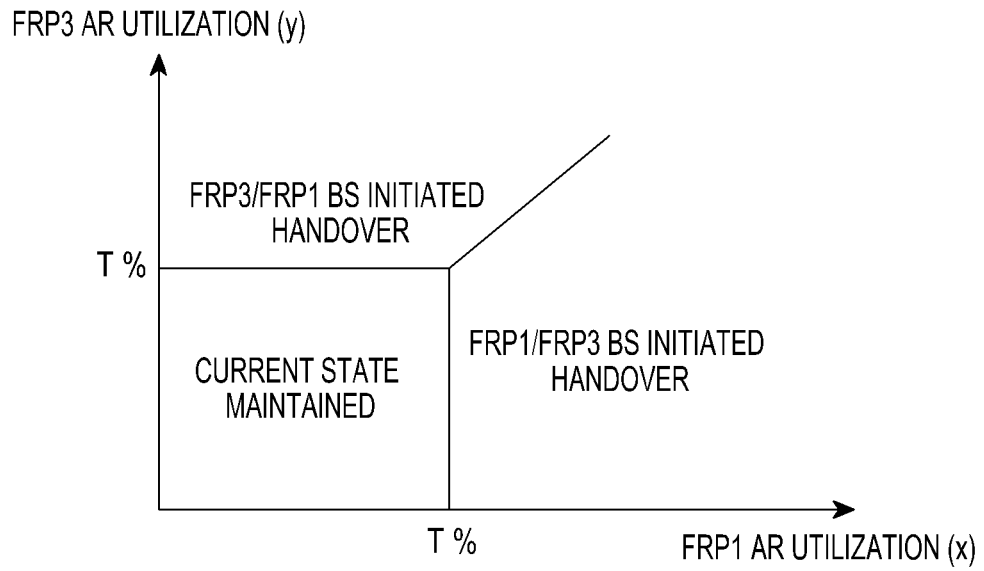
FIG. 6 is a graph illustrating a correlation between FRP3 AR utilization and FRP1 AR utilization in a process of operating a co-site by a BS in a Mobile WiMAX communication system according to the second embodiment of the present invention.

FIG. 6 is a graph illustrating a correlation between FRP3 AR utilization and FRP1 AR utilization in a process of operating a co-site by a BS in a Mobile WiMAX communication system according to the second embodiment of the present invention.

Referring to FIG. 6, the y-axis represents FRP3 AR utilization, the x-axis represents FRP1 AR utilization, and 'T' represents a first AR utilization threshold. As shown in FIG. 6, it is determined that the cell using FRP3 and the cell using FRP1 will be almost similar in terms of co-site interference. Thus, an MS may perform an initial network entry operation to a cell or a co-site according to its geographical location, so the BS may control the loads of the cell and the co-site almost uniformly, performing load balancing.

Next, reference will be made to FIG. 7 to describe an internal structure of a BS in a Mobile WiMAX communication system according to embodiments of the present invention.

Figure 7:
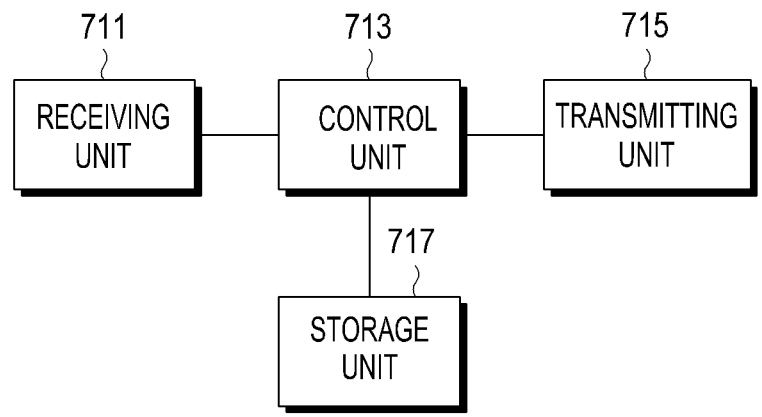
FIG. 7 schematically illustrates an internal structure of a BS in a Mobile WiMAX communication system according to embodiments of the present invention.

FIG. 7 schematically illustrates an internal structure of a BS in a Mobile WiMAX communication system according to embodiments of the present invention.

Referring to FIG. 7, the BS includes a receiving unit 711, a control unit 713, a transmitting unit 715, and a storage unit 717. The control unit 713 controls the overall operation of the BS. In particular, the control unit 713 controls to perform the overall operation related to the co-site operation through the proposed FRP3/FRP1 BS initiated handover and FRP1/FRP3 BS initiated handover. The overall operation related to the co-site operation has been described with reference to FIGS. 1 to 6, so a detailed description thereof will be omitted herein.

The receiving unit 711 receives various messages from MSs under control of the control unit 713. The transmitting unit 715 sends various messages to MSs under control of the control unit 713. The message sent by the transmitting unit 715 may include, for example, a handover initiation message. The storage unit 717 stores various messages received by the receiving unit 711, and various data needed for operation of the BS.

Although the receiving unit 711, the control unit 713, the transmitting unit 715, and the storage unit 717 are implemented as separate units in FIG. 7 by way of example, it will be apparent to those of ordinary skill in the art that they may be implemented with a single unit.

As is apparent from the foregoing description, the present invention makes it possible to operate a co-site in a mobile communication system, contributing to an increase in throughput by carrier addition and thus improving the system performance.

In addition, the present invention makes it possible to operate a co-site considering load balancing in a mobile communication system, contributing to improvement of the entire service quality of the system.

Further, the present invention makes it possible to operate a co-site considering the channel quality in a mobile communication system, contributing to improvement of the entire service quality of the system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for supporting handover by a base station (BS) in a mobile communication system, the method comprising:
    determining mobile stations (MSs) among MSs connected to a cell to perform handover to a co-site;
    performing handover to the co-site using a first air resource (AR) utilization of the cell that uses a first frequency reuse pattern (FRP) and a second AR utilization of the co-site that uses a second FRP; and
    transmitting a handover initiation message to the MSs based on the determination result,
    wherein the determining of the MSs to perform handover to the co-site comprises determining the MSs among the MSs connected to the cell to perform handover to the co-site, if the first AR utilization of the cell is greater than or equal to an AR utilization threshold and the first AR utilization of the cell exceeds the second AR utilization of the co-site, and wherein the first FRP is a frequency reuse pattern considering an aspect of an interference, and the second FRP is a frequency reuse pattern considering an aspect of a spectral efficiency.

2. The method of claim 1, wherein the MSs are determined from MSs having a channel quality exceeding a channel quality threshold in the co-site among the MSs connected to the cell, in order of high channel quality.

3. The method of claim 1, wherein the MSs are determined from MSs having a channel quality exceeding a channel quality threshold in the co-site and MSs except for the MSs having a channel quality exceeding the channel quality threshold among the MSs connected to the cell, in order of high channel quality in the co-site.

4. A base station (BS) in a mobile communication system for supporting handover, the BS comprising:
  a processor configured to:
   determine mobile stations (MSs) among MSs connected to a cell to perform handover to a co-site, and
   perform handover to the co-site using a first air resource (AR) utilization of the cell that uses a first frequency reuse pattern (FRP) and a second AR utilization of the co-site that uses a second FRP; and
  a transmitting device configured to transmit a handover initiation message to the MSs based on the determination result, wherein the determining of the MSs to perform handover to the co-site comprises determining the MSs among the MSs connected to the cell to perform handover to the co-site, if the first AR utilization of the cell is greater than or equal to an AR utilization threshold and the first AR utilization of the cell exceeds the second AR utilization of the co-site, and wherein the first FRP is a frequency reuse pattern considering an aspect of an interference, and the second FRP is a frequency reuse pattern considering an aspect of a spectral efficiency.

5. The BS of claim 4, wherein the MSs are determined from MSs having a channel quality exceeding a channel quality threshold in the co-site among the MSs connected to the cell, in order of high channel quality.

6. The BS of claim 4, wherein the MSs are selected from MSs having a channel quality exceeding a channel quality threshold in the co-site and MSs except for the MSs having a channel quality exceeding the channel quality threshold among the MSs connected to the cell, in order of high channel quality in the co-site.

* * * * *